(12) United States Patent
Altstaetter et al.

(10) Patent No.: US 12,389,140 B2
(45) Date of Patent: Aug. 12, 2025

(54) SYSTEM AND METHOD FOR MANAGING A PHYSICAL LAYER OF AN OPTICAL NETWORK AND EXCHANGE THEREFOR

(71) Applicant: WaveXchange Corporation, Richardson, TX (US)

(72) Inventors: David Altstaetter, Richardson, TX (US); Rohit Kunjappa, Richardson, TX (US)

(73) Assignee: WaveXchange Corporation, Richardson, TX (US)

( * ) Notice: Subject to any disclaimer, the term of this patent is extended or adjusted under 35 U.S.C. 154(b) by 322 days.

(21) Appl. No.: 18/192,512

(22) Filed: Mar. 29, 2023

(65) Prior Publication Data

US 2023/0319442 A1   Oct. 5, 2023

Related U.S. Application Data

(60) Provisional application No. 63/326,152, filed on Mar. 31, 2022.

(51) Int. Cl.
*H04Q 11/00* (2006.01)

(52) U.S. Cl.
CPC ..... *H04Q 11/0005* (2013.01); *H04Q 11/0062* (2013.01); *H04Q 11/0071* (2013.01); *H04Q 2011/0052* (2013.01)

(58) Field of Classification Search
CPC .................... H04Q 11/0071; H04Q 2011/0052
See application file for complete search history.

(56) References Cited

U.S. PATENT DOCUMENTS

| | | | | |
|---|---|---|---|---|
| 4,706,240 A | * | 11/1987 | Payne, III | .......... H04Q 11/0005 370/386 |
| 5,303,078 A | * | 4/1994 | Brackett | ............... H04L 49/108 370/395.31 |
| 2005/0259571 A1 | | 11/2005 | Battou | |
| 2017/0366882 A1 | * | 12/2017 | Lingampalli | ...... H04Q 11/0067 |
| 2018/0041392 A1 | | 2/2018 | Blair | |

OTHER PUBLICATIONS

International Search Report and Written Opinion on PCT/US2023/016756 dated Jun. 26, 2023, 13 pgs.

* cited by examiner

*Primary Examiner* — Sung H Pak
(74) *Attorney, Agent, or Firm* — Foley & Lardner LLP

(57) ABSTRACT

An exchange that provides for owners of physical ports of optical switches on a communications network to list bandwidth availability of the physical ports for selling or otherwise allocating the physical ports to others. The exchange may be configured to automatically transition the allocation of the physical ports between users by altering parameters of digital tokens bound to respective physical ports. A portal may be given to owners and/or licensees of the physical ports to alter routing of the physical ports by controlling the physical layer of the optical switch on which the physical ports reside. By using the principles described herein, conventional manual changes to the physical layer of the optical switches may be reduced or eliminated and owners of the physical ports may more easily offload extra bandwidth being supported by the physical ports.

13 Claims, 14 Drawing Sheets

SYSTEM AND METHOD FOR MANAGING A PHYSICAL LAYER OF AN OPTICAL NETWORK AND EXCHANGE THEREFOR

RELATED APPLICATIONS

This application claims priority to U.S. Provisional Patent Application having Ser. No. 63/326,152 filed on Mar. 31, 2022; the contents of which are incorporated herein by reference in their entirety.

BACKGROUND

Today's communications networks are owned and operated by multiple business entities with their own independent technology backbones that are physically interconnected in multi-tenant datacenters all over the world. These data centers include fiber-optic patch panels or optical network switches or physical layer optical switches (or simply optical switches) often located in a neutral area of the datacenter commonly called the "meet-me-room." The optical switches may be configured to handle communications of 10 Giga bits-per-second (Gbps) to 100 Gbps or higher, for example. The optical switches are used extensively for long distance (e.g., country-to-country) and local distance (e.g., within a country, state, and/or city) communications.

Currently, companies that are connected directly to the communications networks primarily via fiber optic patch panels of a communications company (e.g., AT&T, mom and pop datacenters with network optical switches, etc.) to receive direct communications are required to submit change orders to respective communications companies. The fiber optic patch panels could be replaced with a physical layer optical switch, but state changes on the switch would still require issuing manual change orders. These change orders are typically used for re-routing communications from a first physical port of a physical layer optical switch to a second physical port of the physical layer optical switch. The communications company has to coordinate between each of the entities affected by the change orders by issuing Letters-of Authorization and directing a third-party technician to install a jumper fiber once the change orders are complete. In other words, the communications company uses change orders to make a physical cross-connect change by hand, which is similar to how original telephone switchboard operators would make connections between calling parties and called parties.

There are generally two scenarios where the change orders occur, including:
1. Changing Input Ports: a first party (e.g., Amazon Web Services) that owns an optical network switch located at and managed by a communications company decides to change routing from a first physical port to a second physical port to which the first party connects into the optical network switch; and
2. Changing Output Ports: a first party changing a cross-connection that is initially between a first physical port and second physical port to being between the first physical port and a third physical port (e.g., changing routing between a first city (e.g., Dallas) and second city (Beijing) to be between the first city (e.g., Dallas) and a third city (e.g., Tokyo)).

For each of these two change orders, the communications company physically alters physical optical communications paths at the physical layer of the optical switches. These physical changes are performed by human technicians moving optical cables between physical ports. Because of the complexity of physical panels of optical switches having many physical ports along with many cables being connected thereto, mistakes occur fairly regularly. While the number and frequency of mistakes that occur are not published, as a tell-tale sign that communications companies recognize that physical rerouting mistakes occur, to avoid financial exposure, the communications companies typically do not allow these rerouting changes between November 10th until after New Year's (e.g., January 5th), because communications (e.g., ecommerce shopping) are often at a peak during this time period due to the holiday buying season.

Another problem with the change work orders is that the work to change optical routing takes time, often days or weeks, to actually occur due to (i) physical labor bandwidth limitations and (ii) complexity of coordinating change orders between the facilitator service and two or more communication companies. Additionally, physical cable breakage routinely occurs when moving the optical cables of the optical switches, which further complicates the current operations at communications companies and, more importantly, for customers of the communications companies. Such delays and problems resulting from making the physical changes of cables of the optical switches have resulted in companies being less inclined to make changes unless absolutely necessary. And, because companies are hesitant to make such changes, (i) inefficiency of usage of optical switches exists or (ii) a preferential use of manual fiber optic patch panels is maintained, which results in companies often maintaining excess communications bandwidth that is excessive and expensive.

BRIEF SUMMARY

To overcome the problems of performing change orders by optical network companies and improve efficiency of usage of optical switches, a couple of related optical switch operations may be performed, including (i) remotely re-routing communications at the physical layer of the optical switches via a portal, and (ii) enabling customers of the communications companies who either own the optical switches or lease communications services therefrom to list communications to/from physical ports of the network optical switches on a communications exchange to sublease or otherwise transfer the communications ports. To support rerouting and exchanges of communications paths at the physical layer at optical switches, digital tokens or virtual ports may be bound to physical ports of the optical switches, and those tokens may be owned or assigned to owners or lessees, for example, of the physical ports for managing the physical ports (e.g., rerouting, exchanging, cross-connecting, etc.).

For (i) Remote Rerouting at Physical Layer of Network Optical Switches:

(a) Existing network optical switches are capable of having certain physical layer changes by using software. However, communications companies currently perform those changes internally, so the change orders are needed. One embodiment includes allowing customers to access a portal and/or an exchange platform (e.g., waveXchange) that enables the customers to perform exchanges with other companies and to cause the changes to be automatically performed remotely (i.e., away from an optical switch). The exchange platform may enable an existing customer to remotely change the physical ports to which a server at the customer connects. The customer may remotely change a first physical port to a second physical port for ongoing communications access at an optical switch. Configuration changes at the customer's servers may dictate such a change, for example. When remotely controlled, the optical switch may switch the physical layer between two ports within milliseconds.

(b) Customers may also create contracts with third-parties to provide network and/or communications services for the third-parties. For example, Amazon® Web Services (AWS®) may provide for web hosting services for third-party customers, and in some cases, those third-party customers may purchase higher bandwidth access to the web services for those third-customers. The customers of the communications company, who currently have to submit change orders, may be able to simply use a user interface (e.g., portal) of the exchange platform to cause the physical changes of the network optical switch so that communications between the customer and third-party customer communicate via the network optical switch directly without the communications company having to have a technician make the physical change at the network optical switch.

For (ii) Listing Communications Availability on an Exchange:

For customers of a communications company that have excess network communications capacity for a short or long period of time, a listing service or exchange platform service may be provided by an exchange platform service to enable the customers to list that excess network communications capacity. The listing service allows for the customers to list network communications capacity of physical ports on the network optical switches (e.g., physical port with 10 Gbps of network communications capacity with a particular entity (e.g., AWS)). For example, if AWS owns a network optical switch that may have, for example, 161 physical input ports and 161 physical output ports for a total of 332 total ports on an optical switch that is managed and operated by a third-party communications company, and 10 of the output ports are available to access the services of the customer, then the customer can place those services on the exchange or listing service. The listing may include (i) name of the customer (e.g., AWS), (ii) bandwidth being offered (e.g., 10 Gbps communications direct to AWS), and price (e.g., $200/month). As part of the listing, the customer submits to the exchange specific technical details, such as (i) optical switch identifier, (ii) port number, (iii) routing from the physical port to a network address (i.e., between the network optical switch and the, and (iv) bandwidth, for example. Other technical and non-technical parameters associated with the optical switch, physical port, customer, etc. may be included and optionally listed.

In operation, a third-party may acquire the communications resource. Once acquired, the third-party may submit information to the exchange via a portal or user interface to cause the communications routing to be changed at the physical layer so that the communications routing is changed from the customer's physical port to the third-party's physical port.

The exchange platform has created virtual ports or tokens in the form of software objects that are used to manage the physical layer. Each physical port has an associated virtual port or token that includes information that associates the physical port to an owner/assignee of that physical port. When two physical ports are to be in optical communication with one another, virtual ports associated with each of the physical ports may be associated with one another. In essence, information of the virtual ports or tokens may be stored in databases, tables, or other data object that are used to manage and control the network optical switches remotely from the exchange service.

DETAILED DESCRIPTION

Figure 1:
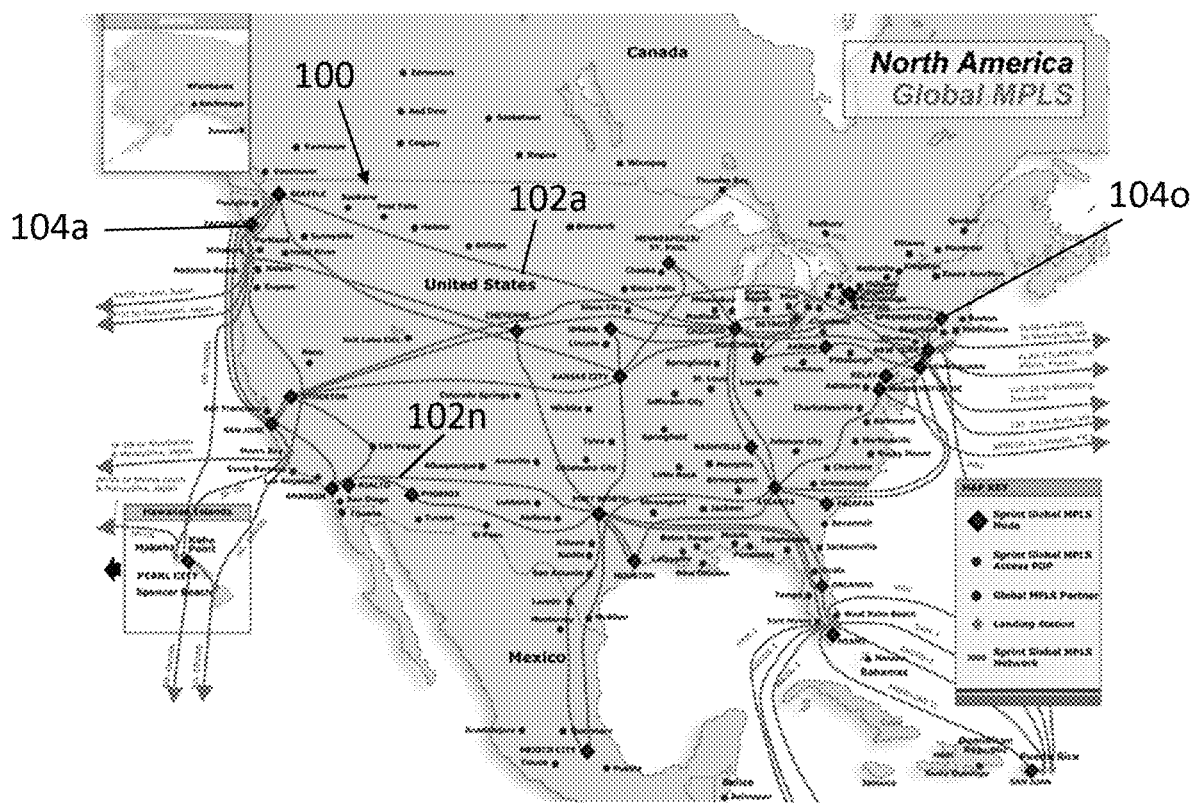
FIG. 1 is an illustration of an illustrative communications network that includes optical network paths that extend over long distances across the United States and nodes at which data centers with optical network switches or optical switches.

With regard to FIG. 1, an illustration of an illustrative communications network 100 that includes optical network paths 102a-102n (collectively 102) that extend over long distances across the United States and nodes 104a-104o (collectively 104) at which data centers with optical network switches or optical switches is shown. The optical network paths 102 are long optical data transport paths capable of communicating the data at high bandwidths, such as 100 Gpbs or higher, and the optical switches at the nodes 104 may be utilized to split local data traffic from the long distance data traffic to be routed to specific destination locations of customers of communications companies. For example, the local data traffic may be routed to web service providers local to the respective nodes 104. As understood, the optical switches at the respective nodes 104 are capable of receiving the high bandwidth data communications and distribute those communications to specific communications channels for routing to local communications companies (e.g., mom and pop routing services companies), which are used to support the backbone of the Internet for local customers.

Customers of communications companies and other data service providers may desire to have direct access to web services or other data support services to avoid data latency due to sharing web services with other local customers. In those cases, the local customers may optionally (i) own optical switch(es), (ii) own one or more dedicated physical ports of one or more optical switches, or (iii) rent one or more dedicated physical ports of one or more optical switches. The physical ports are operating on the physical layer of the communications network 100, which means that physical changes at the optical switches are to be made for data rerouting of optical communications signals.

Historically, technicians move optical cables from one physical port to another when a customer requests for a port change or rerouting of data. However, new optical switches may support rerouting of optical signals through use of software controls. While such software controls may make rerouting of optical signals easier to perform, delays in the rerouting process still exist due to a variety of issues at the communications companies operating the optical switches at the nodes 104. Moreover, there are situations in which companies find themselves having too much communications bandwidth or imbalanced communications bandwidth that reduces efficiency for a company. Other companies looking for additional communications bandwidth, but not enough to purchase an optical switch or maybe have temporary bandwidth growth needs, may have a desire to access communications bandwidth at the physical layer. Challenging logistics for communications companies to manage the optical communications routing at the optical switches can make changes at the optical switches undesirable for companies. As such, the companies desire to find ways to more easily manage their data communications bandwidth at the physical layer of optical switches.

Figure 2:
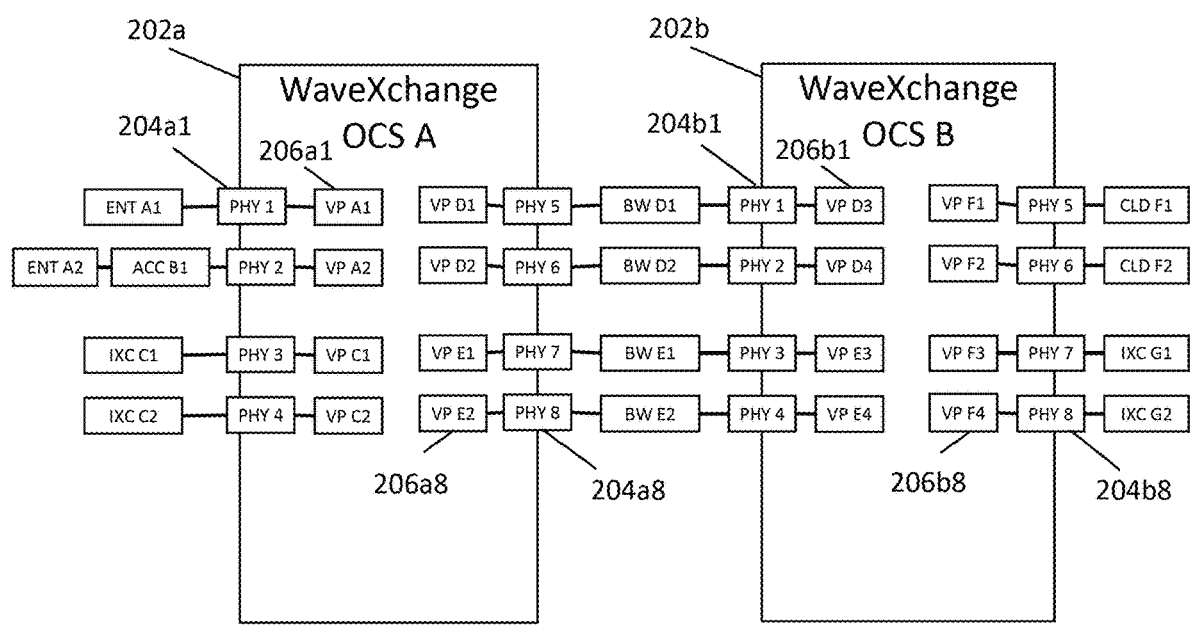
FIG. 2 is an illustration of a portion of an illustrative communications network including a pair of optical circuit switches or optical switches including respective physical ports of the optical switches.

With regard to FIG. 2, an illustration of a portion of an illustrative communications network 200 including a pair of optical circuit switches or optical switches 202a and 202b (collectively 202) including respective physical ports PHY1-PHY8 (204a1-204a8; 204b1-204b8) (physical ports 204a and 204b collectively 204) of the optical switches 202 is shown. Also shown in each of the optical switches 202 are respective virtual ports or digital tokens VP A1-A2, VP C1-C2, VP D1-D2 (206a1-206a8; collectively 206) and VP D3-D4, VP E3-E4, VP F1-F2, VP F3-F4 (206b1-206b8; collectively 206b) (tokens 206a and 206b collectively 206) that are logically bound to respective physical ports. In an embodiment, a facilitator service provider that may provide an exchange platform that enables owners of optical switches 202 and/or physical ports 204 with the ability to remotely manage their owned or leased physical ports by use of a portal or user interface (see FIG. 3). The portal may enable the owners or lessee of the physical ports to remotely perform functions at the physical layer that heretofore required physical movement of cables from one port to another or other physical change by the communications company(s) managing the optical switch(es) 202.

In operation, each of the entities that own or lease the physical ports 204 may register the respective physical ports 204 via a portal. In registering the respective physical ports 204, one virtual port is created for one physical port, which means that a virtual port VP A1 is created and bound to a physical port PHY 1, as an example. The portal (and management system operating in conjunction with the portal) may automatically assign or allocate the physical port to the owner of the physical port by the owner being signed in and associated with the physical port. Once the virtual port or token is allocated to the port owner, the port owner may be provide with the ability to reallocate the virtual port. In an embodiment, the portal may enable registration for all physical and associated virtual ports by an owner, assignee, or licensee, for example, of the physical ports. As an example, Access Provider B may own physical port PHY 2, and may allocate the bound virtual port VP A2 to Enterprise A, such that communications of physical port PHY 2 are routed to a physical port owned or managed by Enterprise A (e.g., a physical port ENT A2 at Enterprise A). Although shown as the physical port ACC B1 of Access Provider B is disposed between physical port PHY 2 of the optical switch 202a and physical port ENT A2 of Enterprise A, it should be understood that the physical port ENT A2 of Enterprise A may directly communicatively connect to the physical port PHY 2 without communications passing through Access Provider B.

In an embodiment, the portal may provide for an exchange in which the virtual port owner may "list" the virtual port of the corresponding physical port in the exchange for acquisition of communications of the physical port (e.g., if the communications service is being sold or if the communications of a physical port is excess bandwidth for the owner of the physical port). By providing listing service functionality of virtual ports, owners of physical ports may be more readily manage their excess capacity bandwidth. Notably, and as further described herein, the exchange may be configured to automatically control operations of an optical switch on which a physical port is physically located. It should be understood that the virtual ports 206 are shown within the optical switches 202, but the virtual ports 206 are software objects that may operate on any device, including located remotely in the "cloud" or on a server of a manager of the portal and/or exchange. No physical layer cross-connects need to be built to support the virtual ports, optical switches, and portals/exchanges.

Figure 3:
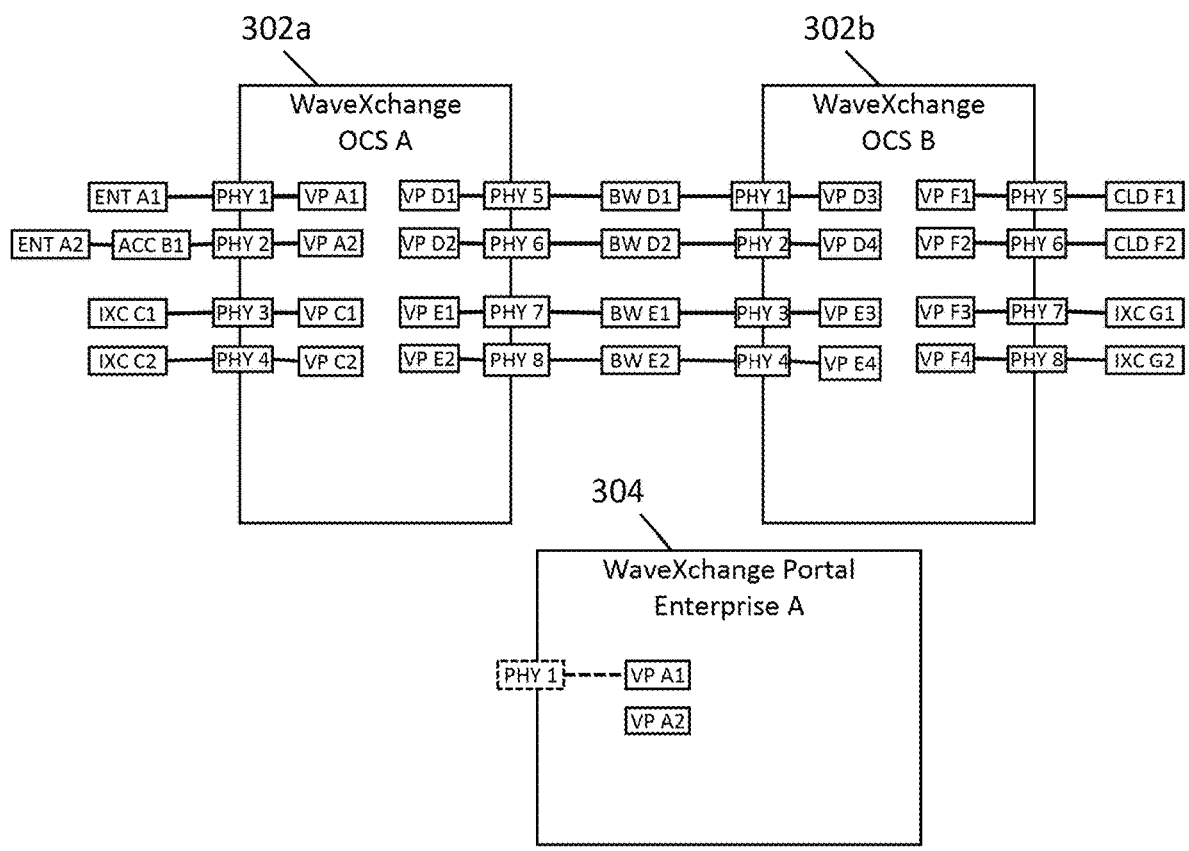
FIG. 3, an illustration of an illustrative communications network including a pair of optical switches along with an illustrative portal provided to enterprises for selectively binding and reallocating virtual ports of respective optical switches with respective physical ports of the respective optical switches that are owned by or assigned to the enterprises.

With regard to FIG. 3, an illustration of an illustrative communications network 300 including a pair of optical switches 302a and 302b (collectively 302) along with an illustrative portal 304 provided to various enterprises for selectively binding and reallocating virtual ports VP A1-A2, VP C1-C2, VP D1-D2, VP E1-E2 and VP D3-D4, VP E3-E4, VP F1-F4 of respective optical switches 302a and 302b with respective physical ports PHY1-PHY8 of the respective optical switches 302a and 302b that are owned by or assigned to the enterprises is shown. As an example, when Enterprise A logs into the portal, Enterprise A only sees the physical and allocated ports assigned thereto. In this case, Enterprise A owns physical port PHY 1 and is allocated physical port PHY 2 via Access Provider B, which owns physical port PHY 2, but allocates the physical port PHY 2 to Enterprise A. The allocation of physical port PHY 2 may cause virtual port "VP A2" to be listed in the portal 304 for Enterprise A along with the owned physical port PHY 1 and corresponding virtual port VP A1. It should be understood that the physical port itself is not used to make crossconnects. Hence, unless Enterprise A wants to reassign physical port PHY 1, the physical port PHY 1 is not part of making connections. It should be further understood that in the example, Enterprise A actually cannot reassign physical port PHY1 because Enterprise A is the registered owner of only one physical port.

Figure 4A:
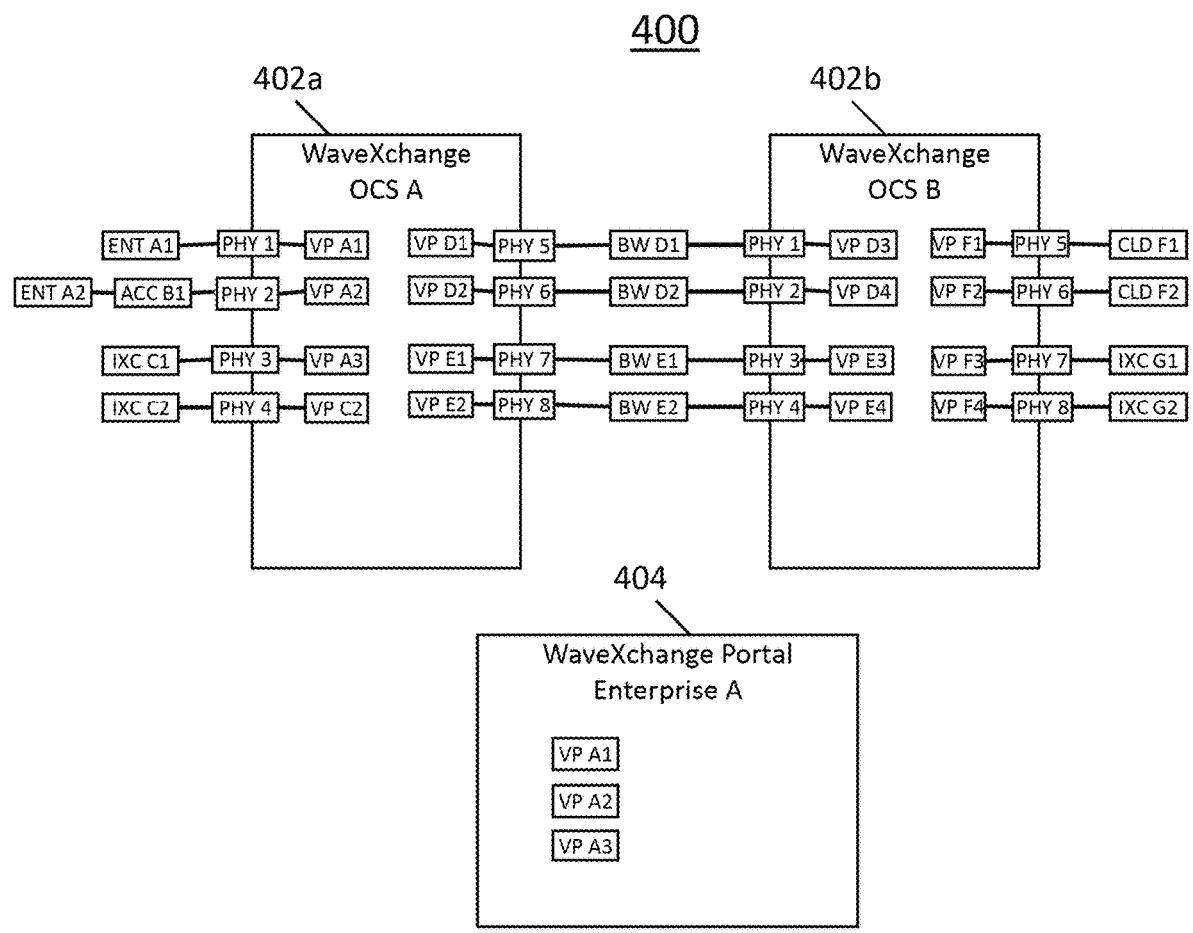
FIGS. 4A and 4B are illustrations of an illustrative communications network including a pair of illustrative optical switches along with an illustrative portal provided to enterprises that own physical ports for selectively binding virtual ports of one optical switch and virtual ports of another optical switch with respective physical ports of the respective optical switches and for enabling the enterprise to physically route communications between a pair of physical ports on an optical switch by establishing a link between a pair of corresponding virtual ports or digital tokens.
Figure 4B:
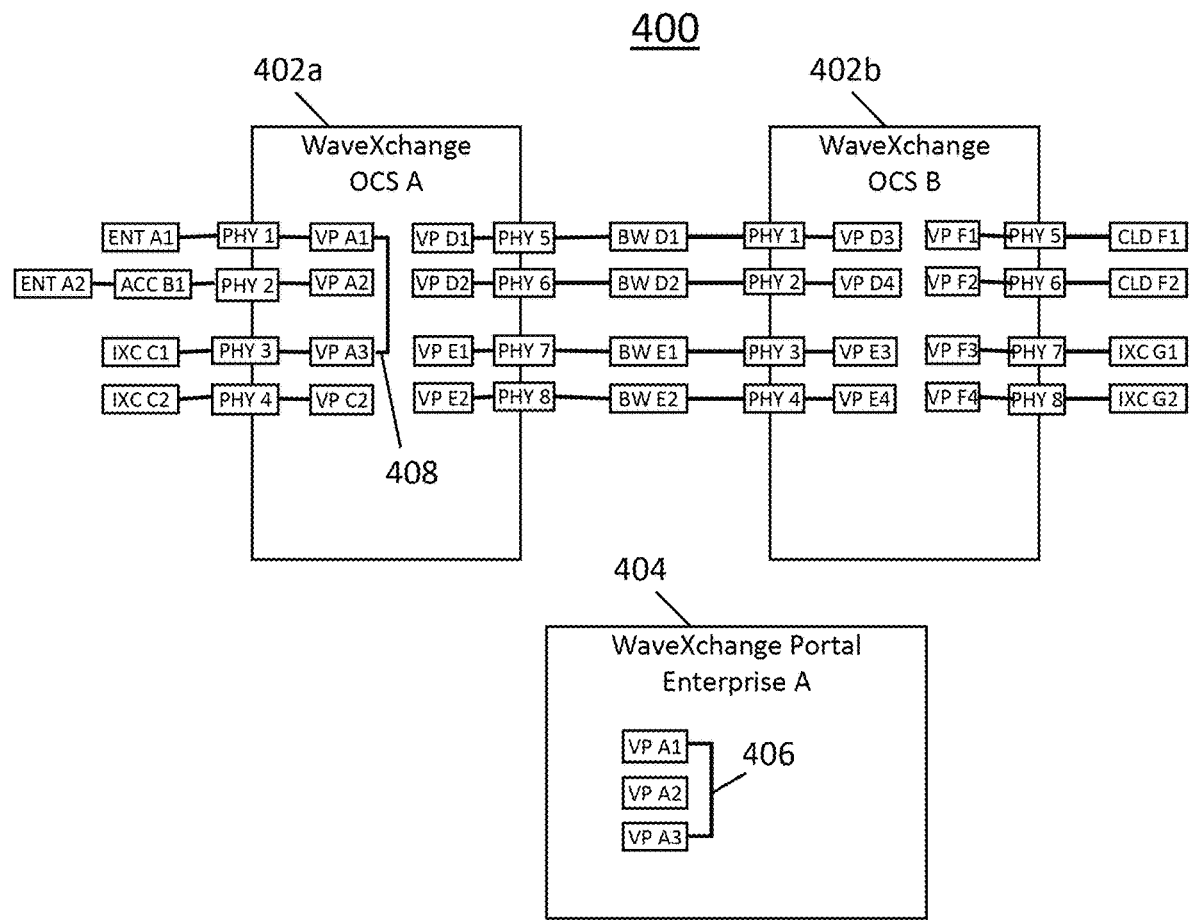

With regard to FIGS. 4A and 4B, illustrations of an illustrative communications network 400 including a pair of illustrative optical switches 402a and 402b (collectively 402) along with an illustrative portal 404 provided to enterprises that own physical ports for (i) selectively binding virtual ports VP A1-A3, VP C2, VP D1-D2, and VP E1-E2 of optical switch 402a and virtual ports VP D3-D4, VP E3-E4, and VP F1-F4 of optical switch 402b with respective physical ports PHY 1-PHY 8 of the respective optical switches 402 and (ii) enabling the enterprise to physically route communications between a pair of physical ports on an optical switch by establishing a link between a pair of corresponding virtual ports or tokens are shown. In this case, after Enterprise A executes a contract, such as a service level agreement (SLA), with interexchange carrier C (IXC) for access to physical port PHY 3, virtual port VP C1, which is bound to physical port PHY 3, is allocated to Enterprise A and renamed to virtual port VP A3 such that Enterprise A now has access to the virtual port VP A3 in the portal 404, and, of course, physical port PHY 3 at the physical layer. In other words, by reallocating virtual port VP C1 to Enterprise A, the physical port PHY 3, which may still be owned by interexchange carrier C, is now allocated to Enterprise A.

As shown in FIG. 4B, Enterprise A is provided with a user interface tool that allows for Enterprise A to route communications between physical ports PHY 1 and PHY 3 by virtually connecting virtual ports VP A1 and VP A3, as shown by a communications path line 406 that connects to both of the virtual ports VP A1 and VP A3 on the portal 404. By the Enterprise A connecting the virtual ports on the portal 404, data communications between a processor managing the portal 404 and the optical switch 402a may cause the physical switches PHY 1 and PHY 3 (PHY 1< >PHY 3) to be in optical communication with one another via optical communication path 408 at the physical layer of the optical switch 402a. A user of the portal 404 does not see or need to know information of the physical port as the virtual port or token VP A3 contains the information of the bounded physical port, in this case physical port PH3. Moreover, for the interexchange carrier C, the fact that Enterprise A owns physical port PHY 1 is of no consequence. As will be described hereinbelow, the tokens may be traded on an exchange platform via a portal.

Figure 5:
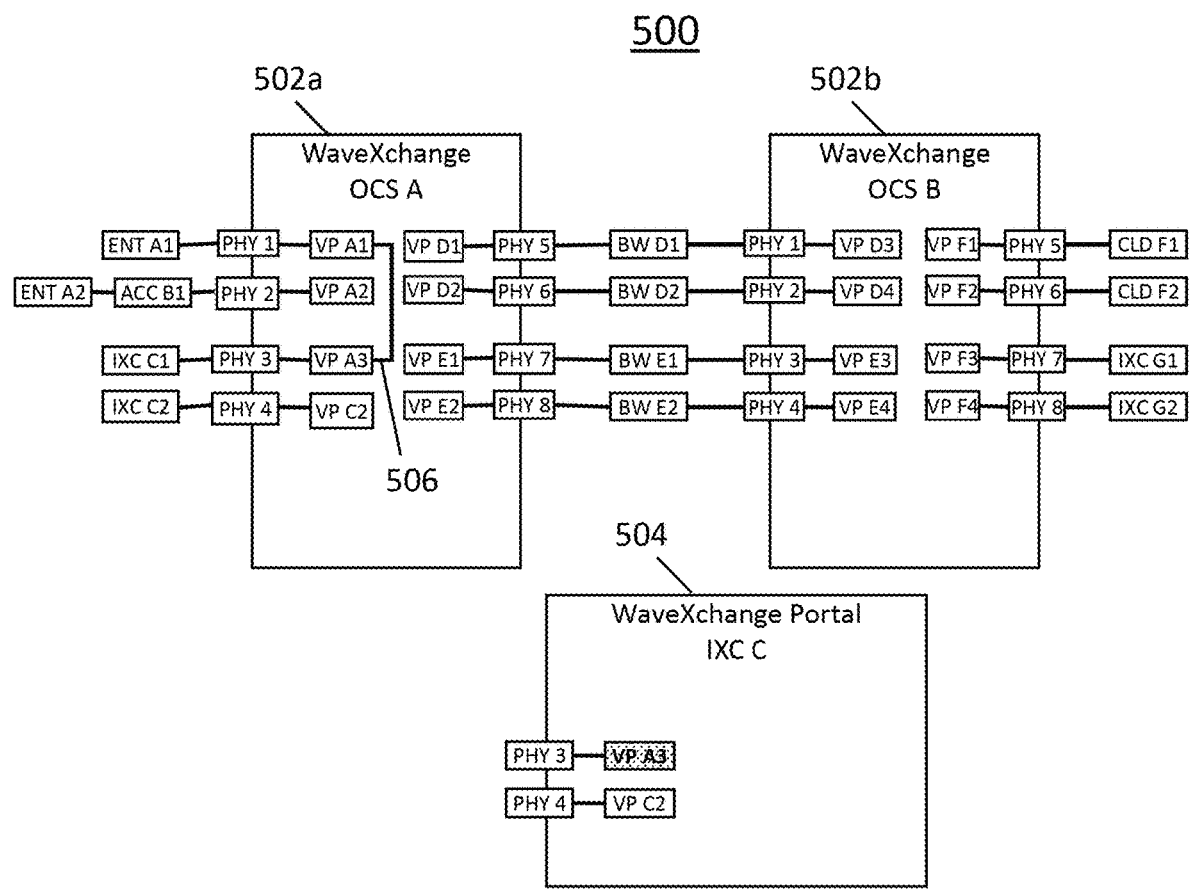
FIG. 5 is an illustration of an illustrative communications network including pair of illustrative optical switches along with an illustrative portal provided to an interexchange carrier.

With regard to FIG. 5, an illustration of an illustrative communications network 500 including pair of illustrative optical switches 502a and 502b (collectively 502) along with an illustrative portal 504 provided to an interexchange carrier (IXC), IXC C, is shown. The portal 504 may enable the IXC C to selectively bind and reassign or reallocate bindings of virtual ports with physical ports, thereby enabling the IXC C to physically route communications between a pair of physical ports of an optical switch. As shown, the portal 504 shows that the IXC C is presented with both owned physical ports PHY 3 and PHY 4 and allocated tokens or virtual ports VP A3 and VP C2. On the portal 504, IXC C can see that token VP A3 is bound with physical port PHY 3 and that the connection is with Enterprise A, but IXC C is not shown to which far end physical port of Enterprise A physical port PHY 3 is actually in communication. Token VP A3 is highlighted, which indicates that the token VP A3 and consequently the physical port PHY 3 is currently allocated to Enterprise A for receiving communications via physical port PHY 3. Control of the communications with IXC C is established by a services level agreement (SLA) between IXC C and Enterprise A, as further provided below with regard to FIG. 6.

Figure 6:
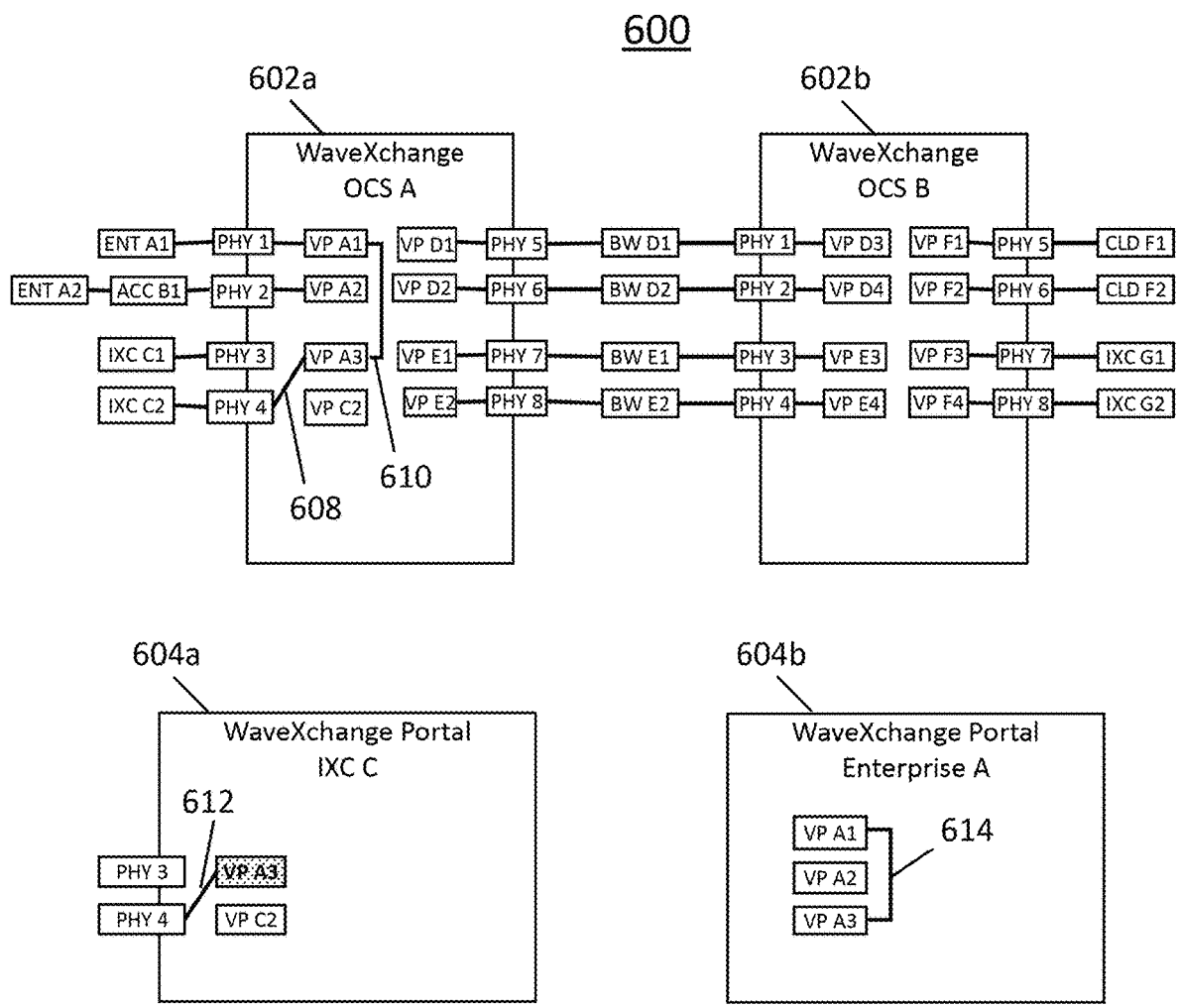
FIG. 6 is an illustration an illustrative communications network including an illustrative pair of optical switches along with portals provided to both an interexchange carrier (IXC) and enterprise (Enterprise A) that enable each to alter communications via physical ports with which each owns or has been allocated and authorized to alter communications via the physical ports.

With regard to FIG. 6, an illustration an illustrative communications network 600 including an illustrative pair of optical switches 602a and 602b along with portals 604 and 606 provided to both an interexchange carrier (IXC) (IXC C) and enterprise (Enterprise A) that enable each to alter communications via physical ports with which each owns or has been allocated and authorized to alter communications via the physical ports is shown. As shown, IXC C reassigns VP A3 to PHY 4. As an administrator of the physical ports PHY 3 and PHY 4, IXC C has the right to reassign the physical ports, and when the reassignment occurs, binding 608 of the token VP A3 moves from physical port PHY 3 to physical port PHY 4. IXC C, of course, still has a responsibility to support Enterprise 3 with communications services to/from physical port PHY 4 as were being provided by physical port PHY 3. As such, physical port PHY 4 meets the requirements of the SLA between IXC C and Enterprise A for communications requirements established by token VP A1. In reassigning the token VP a3, communications between PHY 1 and PHY 3 (i.e., PHY 1< >PHY 3) ceases and communications between physical ports PHY 1 and PHY 4 (i.e., PHY 1< >PHY 4) commences. This reassignment action is different from a cross-connect in that the same interexchange carrier C communicates with Enterprise A, as opposed to communication with a different third-party. In the reassignment scenario as shown, IXC C has actually given up the right to cross-connect VP A3.

As shown in the portals 604a and 604b, IXC C is able to use the portal 604a to move a connection line 612 from being between physical port PHY 3 and token VP A3 to being between physical port PHY 4 and token VP A3. As a result of the change, token VP A3 is now bounded to physical port PHY 4. Similarly, the Enterprise A may use the portal 604b to establish or move a connection line 614 between connect tokens VP A1 and VP A3. As a result of the two configuration changes, communications signals are routed between physical ports PHY 1 and PHY 4. If the service level agreement communications requirements are met, Enterprise A does not see any change to their network topology. And, as far as Enterprise A is concerned, the connection 610 of tokens VP A1< >VP A3 still exists. In other words, Enterprise A is still receiving the same communications services from IXC C, and IXC C is able to allocate physical port resources on the optical switch 602a, as desired.

Figure 7:
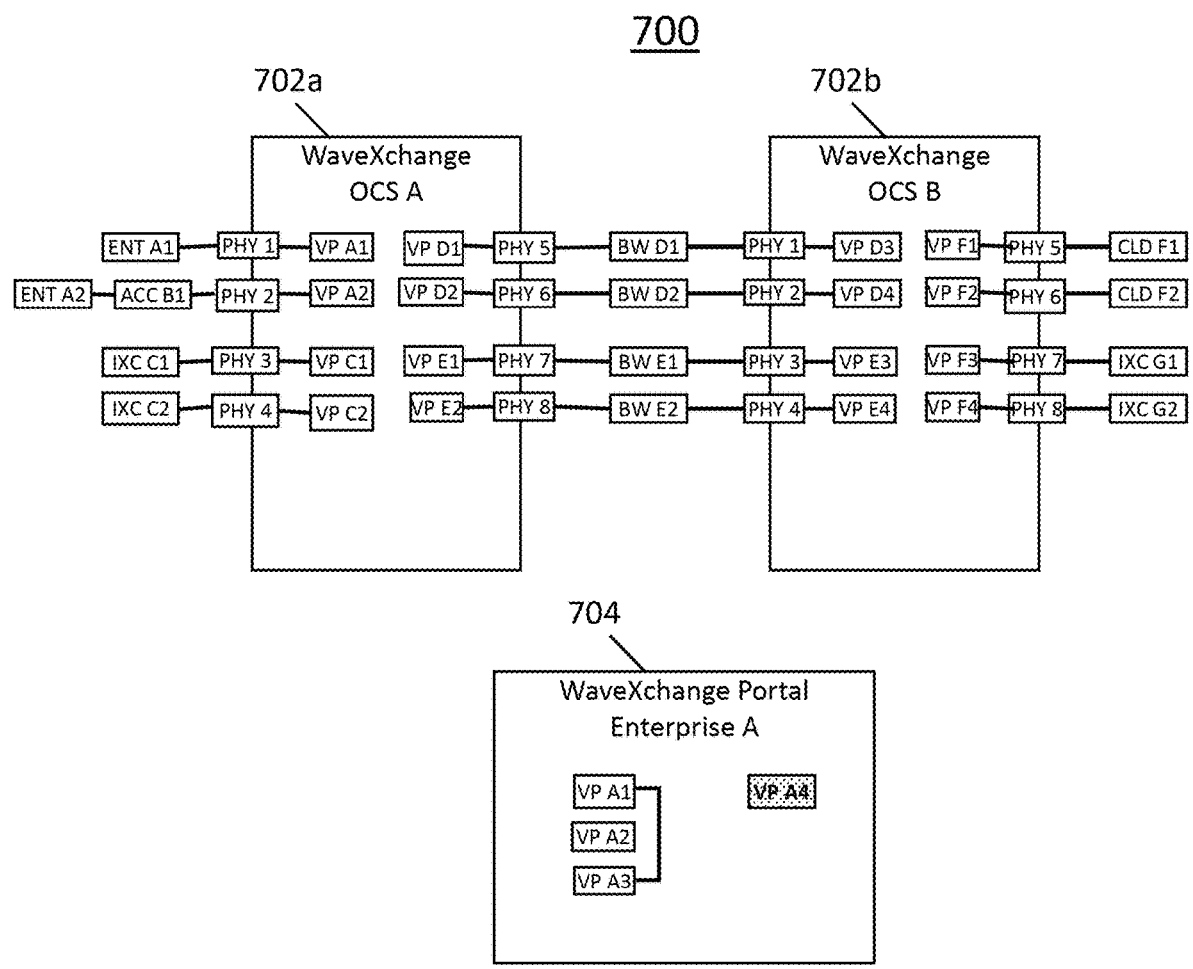
FIG. 7 is an illustration of an illustrative communications network including an illustrative pair of optical switches along with a portal provided to an enterprise to enable the enterprise to alter routing of communications between physical ports.

With regard to FIG. 7, an illustration of an illustrative communications network 700 including an illustrative pair of optical switches 702a and 702b along with a portal 704 provided to an enterprise to enable the enterprise to alter routing of communications between physical ports is shown. In this case, Enterprise A has an executed contract with Cloud Provider F. As such, Cloud Provider F may allocate a physical port PHY 5 for Enterprise A. However, token VP F1 is bound to physical port PHY 5. As such, Enterprise A has no way to access physical port PHY 5 directly on optical switch 702a so needs to route to optical switch 702b to be communicatively connected to physical port PHY 5. As shown in the portal 704, a token VP A4, which may be located on optical switch 802b (see FIG. 8) is unavailable to Enterprise A, as illustrated by the token VP A4 being highlighted or grayed out.

Figure 8:
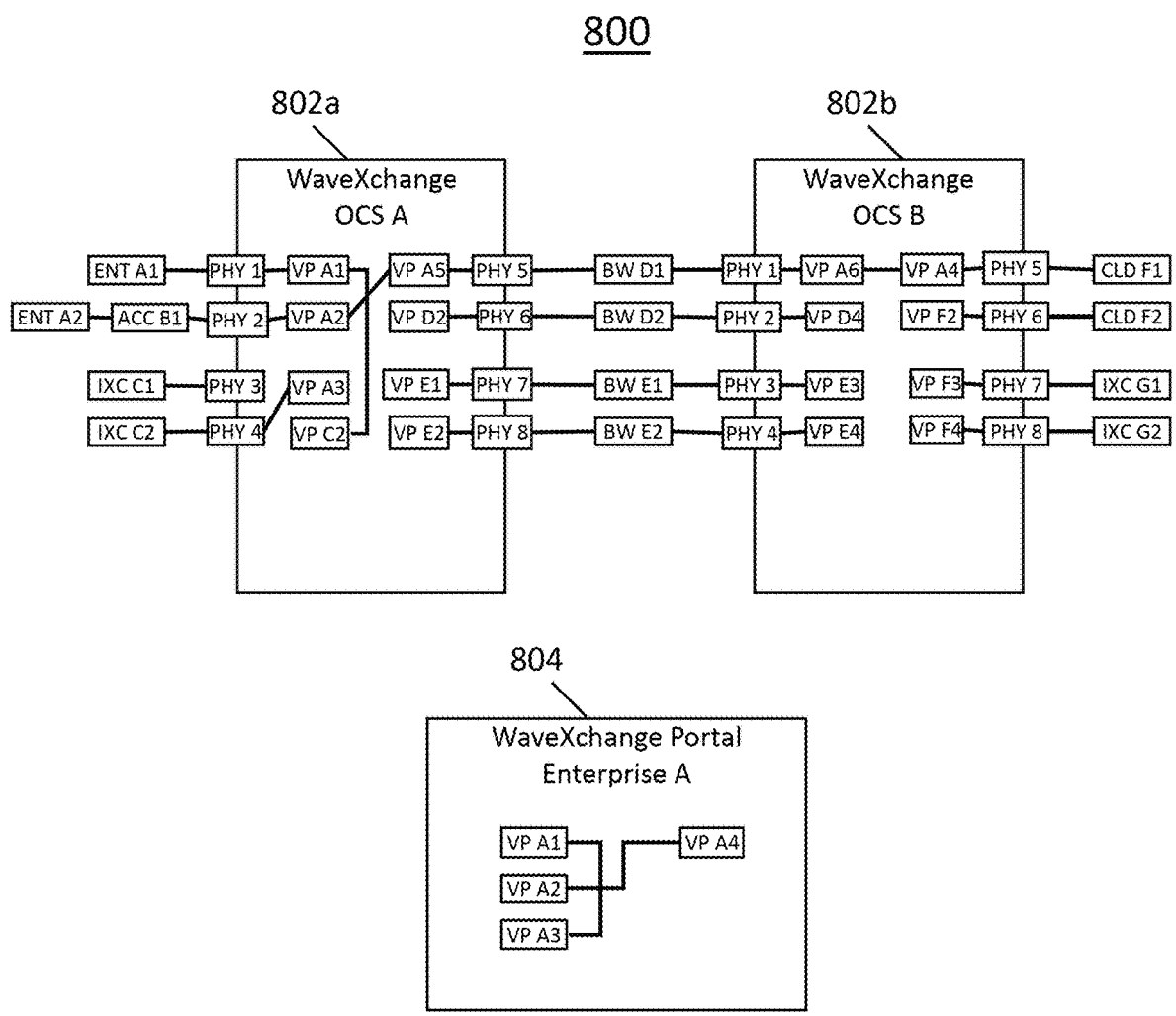
FIG. 8 is an illustration of an illustrative communications network including an illustrative pair of optical switches along with a portal provided to an enterprise to enable the enterprise to alter routing of communications between physical ports.

With regard to FIG. 8, an illustration of an illustrative communications network 800 including an illustrative pair of optical switches 802a and 802b (respectively OCS A and OCS B) along with a portal 804 provided to an enterprise to enable the enterprise to alter routing of communications between physical ports is shown. In this example, Enterprise A has executed a service level agreement (SLA) or contract with Cloud Provider F, as was the case with FIG. 7. However, the portal 804 enables Enterprise A to establish a routing connection between physical port PHY 2 of optical switch 802a and physical port PHY 5 of optical switch 802b. In order for the two physical ports PHY 2 of optical switch 802a and PHY 5 of optical switch 802b to communicate with one another, Enterprise A executes a contract with Bandwidth Provider D, and two virtual ports or tokens VP D1 and VP D2, are allocated to Enterprise A. Tokens VP D1 and VP D2 are not shown in the portal 804 because the information associated with the virtual bandwidth ports are not accessible to Enterprise A, but rather accessible to Bandwidth Provider D. Enterprise A is generally concerned with connecting physical port endpoints (e.g., OCS A: PHY 2< >OCS B: PHY 5), so the physical ports, optical paths, etc., between the physical port endpoints (are not added to the portal 704 for Enterprise A. Tokens and physical ports that may be used by the Bandwidth Provider D and/or other providers to complete the end-physical port-to-end-physical port communications connection, in this case OCS A: PHY 2< >OCS B: PHY5, may be presented on portals of one or more other communications provider.

In an embodiment, Enterprise A may not be directly charged for virtual bandwidth ports (e.g., OCS A: PHY 5, OCS B: PHY 1), as that cost is part of the bandwidth fee of Bandwidth Provider D. It should be understood that connectivity between the Exchange Points could be provided by several different partial communications service providers in part because it would be cumbersome for Enterprise A to see all of the ports and associated cross-connects between the end physical ports OCS A: PHY 2 and OCS B: PHY 5. The use of the principles described herein with the tokens (e.g., tokens VP A1-A3) and portal 804 for Enterprise A simplifies coordinating each physical port, cross-connect, and communications leg between two endpoints of the communications network 800 for Enterprise A (and other enterprises, interexchange carriers, bandwidth providers, cloud providers, etc.).

For example, Enterprise A can now create a connection to Cloud Provider F by graphically connecting a line between an available token, such as token VP A2 and token VP A4, as shown, which actually creates the following token and physical port connections within and between the optical switches 802:

OCS A: PHY2< >PHY5 (VP A2< >VP A5)
OCS A: PHY 5< >OCS B: PHY 1 (along BW D1)
OCS B: PHY1< >PHY5 (VP A6< >VP A4)

From the point-of-view of Enterprise A, a single cross-connect event occurs regardless of the number of intermediate bandwidth ports or other connections that are made. It is also expected that the bandwidth could be procured as part of an attempt by Enterprise A to connect virtual ports at different optical switches in different exchange points. Such an action may be a driver for generating offers from the existing exchange services to deliver bandwidth between the exchange points.

Figure 9:
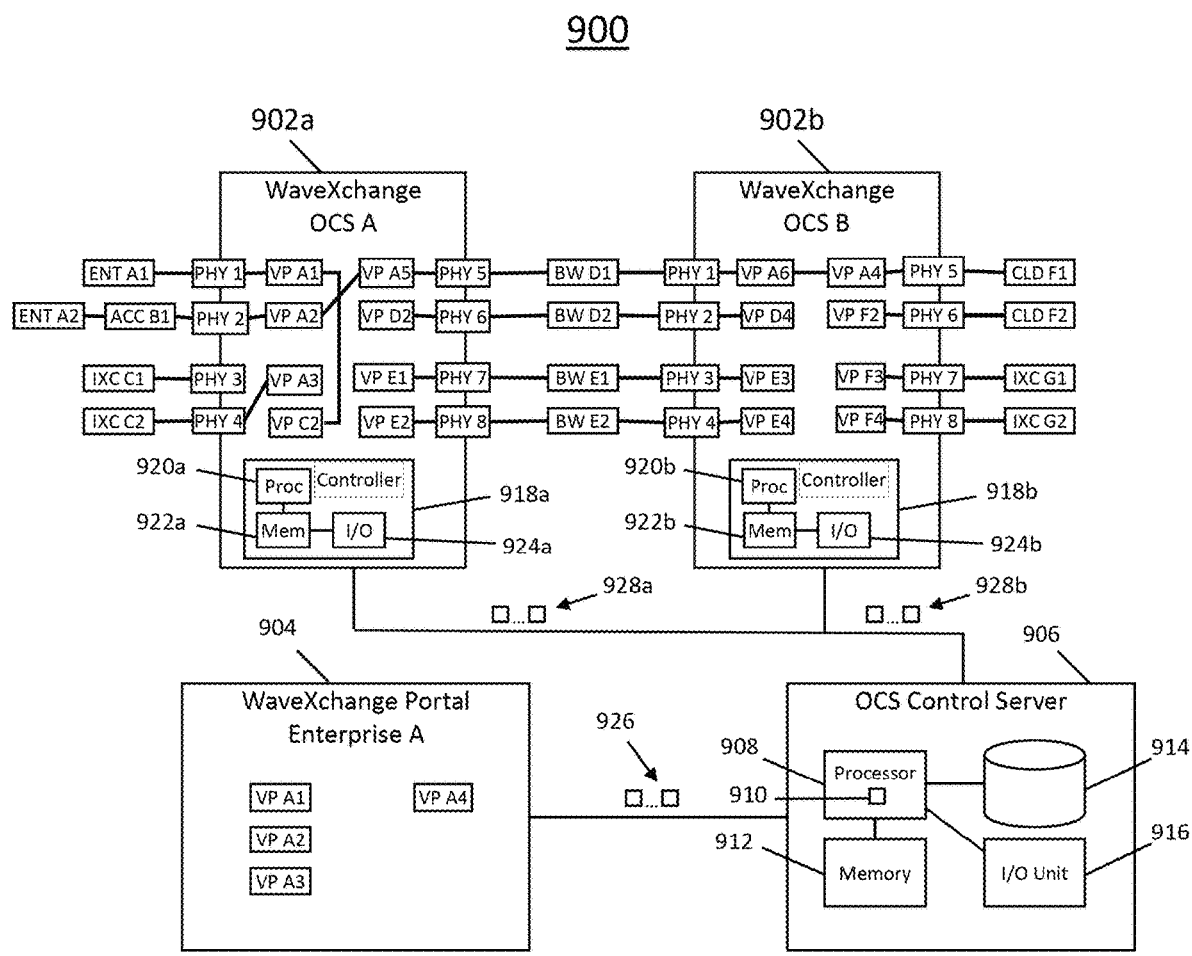
FIG. 9 is an illustration of an illustrative communications network including an illustrative pair of optical switches along with a portal and optical switch (OCS) control server used to receive and process instructions from the portal that may be executed on a computing device.

With regard to FIG. 9, an illustration of an illustrative communications network 900 including an illustrative pair of optical switches 902a and 902b (respectively OCS A and OCS B) (collectively 902) along with a portal 904 and optical switch (OCS) control server 906 used to receive and process instructions from the portal 904 that may be executed on a computing device (not shown) is shown. The server 906 includes a processor 908 that executes software 910 to enable an operator of Enterprise A to manage and control owned or allocated physical ports and corresponding virtual ports or tokens. The software 910 may be configured to operate the portal 904 along with communicating directly or indirectly with optical switches 902. The server 906 may further include non-transient memory 912 for storing data, such as tables inclusive of tokens, and software, in communication with the processor 910. The processor 912 may further be in communication with a storage unit 914, configured to store data and software, and an input/output (I/O) unit 916 configured to communicate over one or more communications networks to support the portal 904 and optical switches 902 using any communications protocol. Although the server 906 is shown as a single computer with a single processor 908, it should be understood that the functionality performed by the server 906 may be performed on multiple servers and/or processors, especially if the optical switches 902 include more than two optical switches and are distributed across multiple countries, for example.

The optical switches 902 may respectively include controllers 918a and 918b (collectively 918) that include one or more processors 920a and 920b (collectively 920), memory 922a and 922b, and I/O units 924a and 924b. The processors 920 may execute software (not shown) that is configured to control optical and/or other components on the physical layer to enable optical signals to be communicated and re-routed, as further described herein.

In operation, an operator or user at Enterprise A (or proxy therefor) using the portal 904 may perform operations to connect or otherwise adjust the displayed tokens (e.g., VP A1, VP A2, VP A3, and VP A4) so as to cause optical signals from physical ports to which the tokens are bound to communicate with one another irrespective of the optical switches at which the physical ports are located. In response to the operator performing an action on the portal 904, communications signals 926 that may include data and/or commands may be communicated to the server 906 for storing and communicating to signals 928a and 928b to the respective optical switches. The signals 928a and 928b may be communicated to specific network locations using network addresses of the optical switches 902 or broadcast to each of the optical switches 902 and processors 920 at the optical switches 902 may accept the communications signals that include control signals that are associated with corresponding tokens and physical ports. The server 906 may further be configured to establish tables that represent optical communications paths between each allocated physical port and bound tokens.

Because the portal 904, server 906, and optical switches 902 are in communication with one another and control of the physical layer may be automatically and dynamically adjusted in real or substantially real-time (taking into account network and device latency), the principles described herein may be performed in a manner that is faster and easier than existing processes, which generally include change orders and human intervention at one or more communications companies, as previously described. If the users utilize an exchange for listing and selling, trading, or otherwise exchanging communications of physical ports for a limited period of time or permanently, the server 906 and data records stored thereon may manage ownership or assignees associated with the tokens so that new owners or assignees may have access to a portal and control the tokens in the same or similar manner as provided herein.

Figure 10:
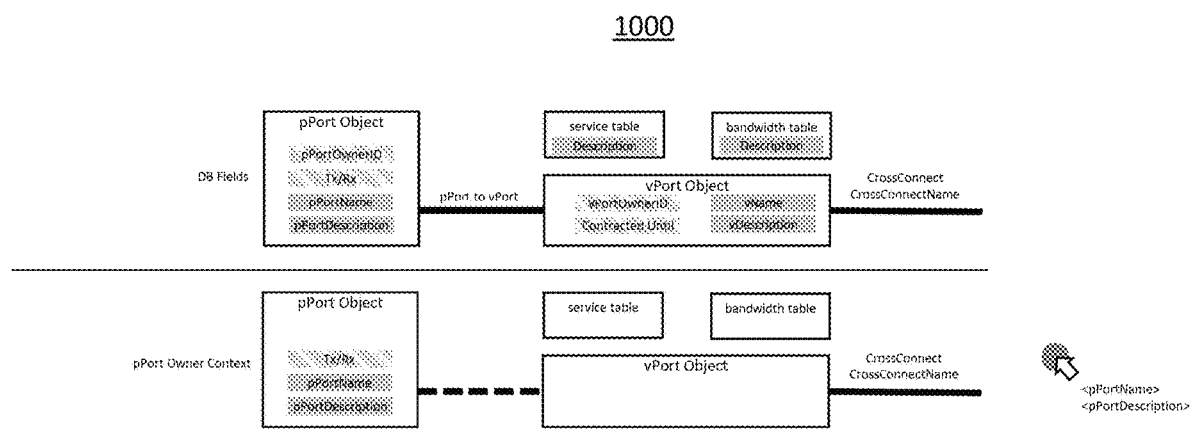
FIG. 10 is a block diagram of an illustrative set of data objects that may be used to manage physical ports and tokens.

With regard to FIG. 10, a block diagram of an illustrative set of data objects 1000 that may be used to manage physical ports and tokens is shown. The data objects 1000 may include database fields that establish binding relationships between the tokens and physical ports. The data objects 1000 may further include tables, including service tables and bandwidth tables, to establish cross-connects and communications paths over which optical communications signals may be routed between physical ports as defined by data stored in the tokens. Below is a listing of data object fields and descriptions therefore that may be used for the data objects to perform ownership, management, control, and routing functionality, amongst other functions.

pPort Owner: user that's connected to a physical port and is consuming the physical port
vPort has not been listed in the marketplace
vPort Seller: user that's connected to a physical port and is selling the associated service
vPort: tokenization of a physical port; has been listed or sold in the marketplace
vPort Buyer: user that that bought a service in the marketplace
Physical/Virtual ports are abstractions that are (generally) not presented to the user:
Users see "ports" and parameters
The parameters are pPort and vPort fields displayed to the user based on context
Notable exception: sellers will be able to change the assignment of pPort to vPort
Even in this case, seller context is port and associated service pName/vName: These values are unique for the <owner/NE>
pDescription/vDescription Services or Bandwidth Description: vDescription could initially inherit from Services or Bandwidth when the service is listed. Buyer may edit the vDescription later.
Services or Bandwidth Description: Field is in the services or bandwidth tables. This field may be set by the seller at the time the service is listed in the marketplace.
Service ID: Use the unique vPort ID for differentiation.
Point services table may include a field called services ID, which may or may not be unique when a bandwidth provider participates. Moreover BWID is tied to physical ports, not the service, which may change with assignment.
Therefore, vPortID may be used, but displayed as "Service ID" or "WaveXchange Service ID"

Figure 11:
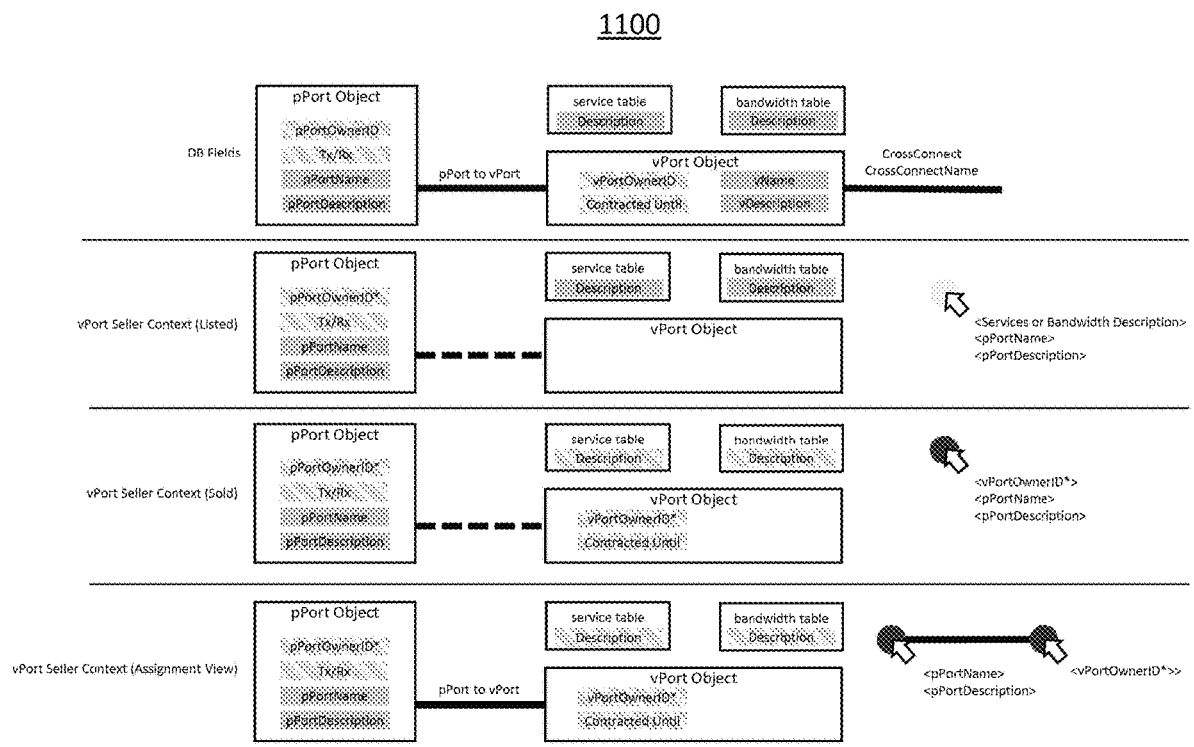
FIG. 11 is a block diagram of an illustrative set of data objects that may be used to manage physical ports and tokens of optical switches.

With regard to FIG. 11, a block diagram of an illustrative set of data objects 1100 that may be used to manage physical ports and tokens of optical switches is shown. The data objects 1100 may include data fields associated with virtual port sellers of different types based on the context in which the seller views the data.

Figure 12:
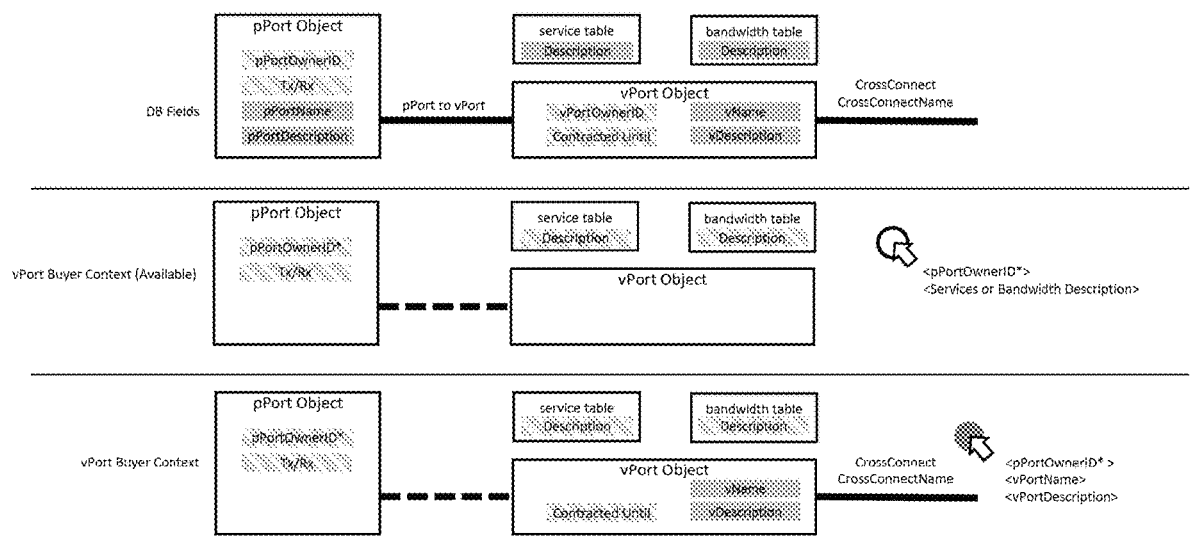
FIG. 12 is a block diagram of an illustrative set of data objects that may be used to manage physical ports and tokens of optical switches.

With regard to FIG. 12, a block diagram of an illustrative set of data objects 1200 that may be used to manage physical ports and tokens of optical switches is shown. The data objects 1200 may include data fields associated with virtual port buyers of different types based on the context in which the buyer views the data.

The data objects of FIGS. 11 and 12 may be used for managing ownership, assignments, allocations, etc., of physical ports of optical switches in an exchange for owners or authorized resellers or lessors of the physical switches. The information or fields contained in the data objects are used to manage ownership information, assignment information, contract information, port information, etc., so that the physical layer of a communications network may be more easily managed independent of operators of the communications network, thereby improving efficiency and reducing errors, as currently understood.

Figure 13:
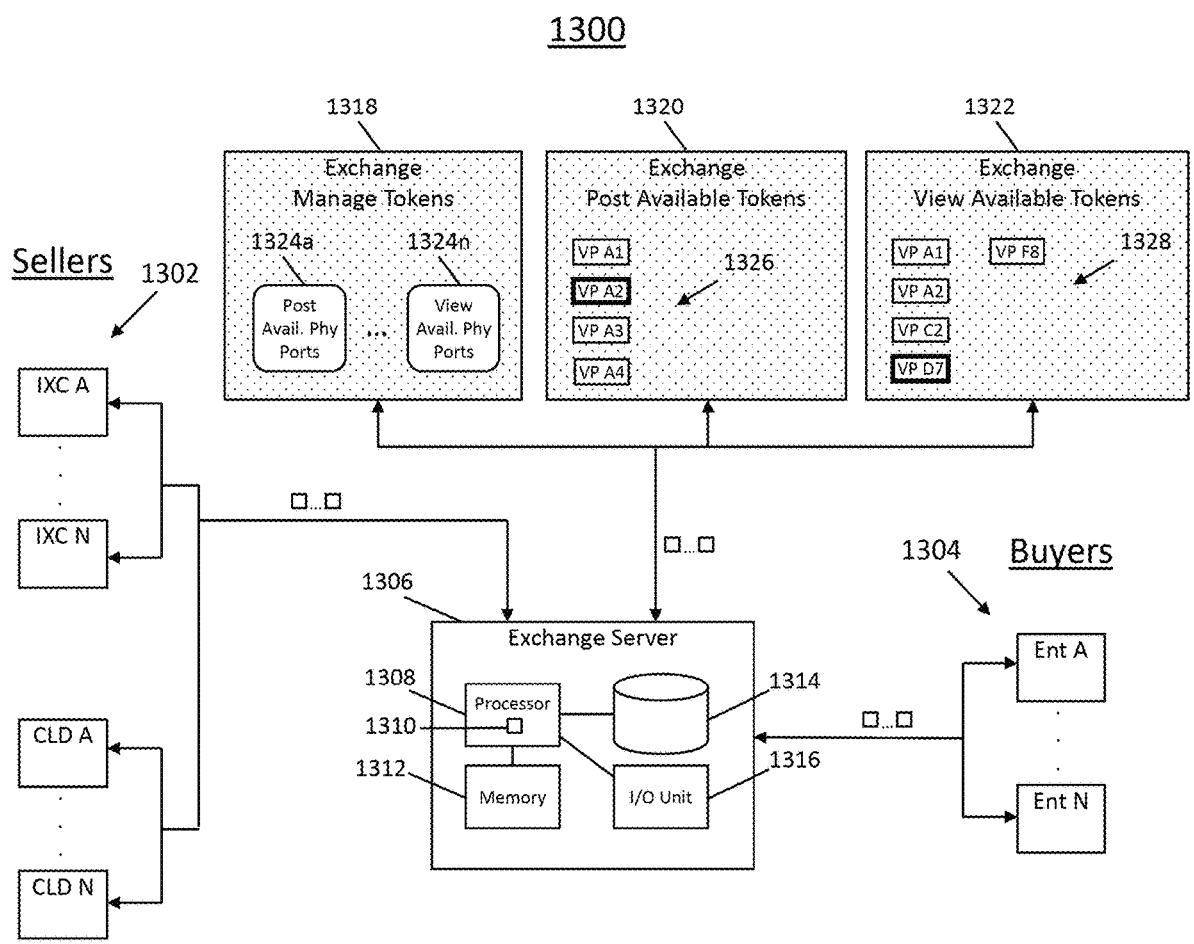
FIG. 13 is an illustration of an illustrative network environment in which sellers and buyers of bandwidth of physical ports through use of tokens associated with the physical ports.

With regard to FIG. 13, an illustration of an illustrative network environment 1300 in which sellers 1302 and buyers 1304 of bandwidth of physical ports through use of tokens associated with the physical ports is shown. As previously described, the ability (i) for sellers 1302 to sell available bandwidth owned or allocated to the sellers 1302 and (ii) for buyers 1304 to buy available bandwidth made available for purchase or assignment may be provided by the network environment 1300 via an exchange provider operating an exchange server 1306, for example. The exchange server 1306 may include a processor 1308 configured to execute software 1310 for performing exchange services functionality. The processor 1308 may be in communication with a memory 1312 on which data and/or software may be stored. The data may include tables (not shown) used to manage allocation and availability of physical ports, tokens, etc. The processor 1308 may further be in communication with a storage unit 1304 configured to store data and/or software and I/O unit 1316 configured to communicate over communications networks, such as with computing devices of the sellers 1302 and buyers 1304, for example.

The software 1310 may be configured to operate and manage user interfaces 1318, 1320, and 1322 of an online exchange operating as a software-as-a-services (SAAS) model, for example. The user interface 1318 of the exchange enables owners or assignees (or other allocated party) of bandwidth services from physical ports of optical switches at the physical layer to select from soft-buttons 1324a-1324n, which may include a "Post Available Tokens" soft-button 1324a and "View Available Tokens" soft-button 1324n for the sellers 1302 to list communications bandwidth of available physical ports bound to respective tokens to sell or otherwise transfer access to another party and acquire communications bandwidth of available physical ports bound to respective tokens.

In the user interface 1320, one of the sellers 1302, such as IXC A, may view currently owned and/or allocated tokens 1326 bound with physical ports owned or allocated to IXC A. The tokens 1326 are shown to include VP A1, VP A2, VP A3, and VP A4, which are bound to physical ports on one or more optical switches. For example, if IXC A owns or is allocated (through the exchange or otherwise) OCSA: PHY 1, OCS A: PHY 2, OCS A: PHY4, and OCS B: VP A4, then those tokens may be available for the IXC A to post on the exchange as available tokens. It should be understood that if any of those tokens are posted on the exchange, that if any other entity purchases those token(s), that the entire communications bandwidth of the bound physical port may be transferred to the other entity. As shown, IXC A has selected VP A2 of the available tokens 1326 for posting to the exchange. Although the names of the virtual ports or tokens are simply listed as VP A1, VP A2, VP A3, and VP A4, it should be understood that more details, including location of switch, current owner of the bound physical port, entity (e.g., AWS®) to which communications of the physical port are being communicated, and so on.

In the user interface 1322 of the exchange, available tokens 1328 are displayed. Because the available tokens may be from any entity listing available tokens on the exchange, the tokens may include names from any of the sellers 1302. For example, the available tokens include VP A1, VP A2, VP C2, VP D7, and VP F8. As previously described, additional information may be available for a potential buyer to view, including by hovering a pointer over the name of the available tokens 1328, and that additional information may include location of an optical switch, current owner, communication service provider to which that physical port is being serviced, and so on. It should be understood that other user interfaces of the exchange may be provided, including selling specifications page(s), acquisition specifications page(s), and so on so that a buyer may simply acquire or otherwise negotiate against a seller of the communications bandwidth of a physical port.

Terms for selling and buying the tokens may include duration (e.g., date range, duration from a current date, etc.), cost for the token plus any incidental costs, etc. may also be presented to the buyers 1304 of the available tokens 1328. A purchase tokens user interface may enable a buyer to submit information, including buyer information, physical port location to which communications from the physical port are to be routed, token to which the purchased token is to be associated so that communications are routed between the bound ports, and so on. In response to a buyer acquiring a token (e.g., token VP D7), the exchange server 1306 may be configured to automatically and dynamically cause the acquired token to be update with information of the buyer and communicate with one or more control servers and/or optical switches to cause the physical layer of the optical switch on which the physical port bound to the acquired token to be properly physically altered to change communications of the bound physical port.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

The previous description is of various preferred embodiments for implementing the disclosure, and the scope of the invention should not necessarily be limited by this description. The scope of the present invention is instead defined by the claims.

What is claimed:

1. A method for managing a physical layer of a network, said method comprising:
    forming a first token associated with a first physical port of an optical switch of the network, the token being allocated to an owner or assignee of the first physical port;
    binding the first token to the first physical port by establishing a logical relationship between the first physical port and the token;
    enabling the owner of the first physical port and a second physical of the optical switch to make a physical change of the first physical port to the second physical port independent of an operator of the optical switch by the owner changing a binding of the token from the first physical port to the second physical port.

2. The method according to claim 1, further comprising assigning an ownership attribute of the token to include an identifier of the owner.

3. The method according to claim 1, further comprising:
    providing a user interface of a portal to enable the owner to alter a physical port attribute of the token in changing the binding of the token from the first physical port to the second physical port; and
    responsive to the owner altering the physical port attribute of the token, automatically causing the token to be associated with the second physical port.

4. The method according to claim 1, further comprising setting a cross-connect attribute of the token to include an identifier associated with a second token bound to a second physical port, thereby causing optical signals to be routed between the first physical port to the second physical port of the optical switch.

5. The method according to claim 4, further comprising:
    providing a user interface to enable a second owner of the second physical port to alter a physical port attribute of the second token from the second physical port to a third physical port owned by the second owner; and
    responsive to the second owner altering the physical port attribute:
        automatically causing the optical signals to be routed between the first physical port and the third physical port of the optical switch.

6. The method according to claim 4, further comprising:
    changing the identifier of the cross-connect attribute of the token to be changed from the identifier of the second token to an identifier of a third token bound to a third physical port; and
    automatically causing the optical signals from being routed between the first physical port and the second physical port to being routed between the first physical port and the third physical port.

7. The method according to claim 6, further comprising:
    providing a user interface that enables the second owner to list the second token for acquisition; and
    responsive to the third owner of the third physical port purchasing the second token, changing the cross-connect attribute of the token to include the identifier of the third token, thereby causing an optical communication path to be established between the first and third physical ports.

8. A computer-implemented method, comprising:
    receiving, by a processor from a first user that is allocated optical communications signals via a physical port of an optical switch of a communications network, a digital token inclusive of information associated with the first user and physical port for the first user to make the communications via the physical port available for purchase by a second user;
posting, by the processor, at least a portion of the information of the token to a user-selectable list of available communications via a plurality of physical ports bound to a plurality of respective digital tokens of one or more optical switches of the communications network;
in response to a second user selecting to have the optical communications signals via the first physical port allocated to the second user, replacing, by the processor, at least a portion of the information of the token to include information of the second user, thereby causing the optical communications signal s via the first port to be allocated to the second user; and
causing, by the processor, a physical change of the optical switch on which the physical port is located to cause the optical communications signals to be routed to an optical communications device of the second user.

9. A method of transacting a physical layer connection on an optical switch on a communication network, said method comprising:
assigning a first physical port to a first user, the first physical port being optically connected to a second physical port on the optical switch of a second user;
enabling a second user to list communications from the first the first physical port to be available for allocation to a third user;
in response to the third user initiating the communications to be communicated to the a third physical port, enabling the optical communications signals to be rerouted from being between the first physical port and the second physical port to being between the first physical port and a third physical port of the third user; and
in response to reassigning communications to be allocated the first physical port to the third physical port and initiating a cross-connect change request of the first physical port to the third physical port, automatically causing a physical change in the optical switch to cause the optical communications between the first physical port and the second physical port to be between the third physical port and the second physical port.

10. The method of claim 9, further comprising enabling, after reassignment of the first physical port, the first user to cross-connect the third physical port to a fourth physical port associated with the first user.

11. The method according to claim 9, further comprising:
associating a digital token to be associated with the first physical port; and
in response to the reassignment of the first physical port by the first user to the second user:
altering a first parameter of the digital token from being indicative of the first user to being indicative of the second user; and
altering a second parameter of the digital token to be associated with the first physical port to being associated with the third physical port.

12. The method according to claim 9, further comprising:
enabling the first user to list, with an exchange listing service, communications from the first hardware port to be available to another user;
enabling a fourth user to acquire the communications from the first physical port, the fourth user being associated with a fourth physical port; and
in response to the fourth user establishing a relationship with the first hardware port via a user interface associated with the exchange listing service, causing a physical change in the physical layer optical switch so as to cause the first physical port from being optically connected to the second physical port to being optically connected with the fourth physical port on the physical layer optical switch.

13. The method according to claim 9, further comprising:
enabling the first user to list, with an exchange listing service, communications from the first hardware port to be available to another user;
enabling a fourth user to acquire the communications from the first physical port, the fourth user being associated with a second digital token that is associated with a fourth physical port; and
in response to the fourth user altering a parameter of the second software object to also be associated with the first hardware port, changing a first parameter of a first software object associated with the first physical port from being associated with a third digital token associated with the second physical port to being associated with the second digital token associated with the fourth physical port, thereby causing a physical change in the physical layer optical switch so as to cause the first physical port to be optically connected from the second physical port to the fourth physical port on the physical optical switch.

* * * * *